(12) United States Patent
Li et al.

(10) Patent No.: US 8,713,303 B2
(45) Date of Patent: Apr. 29, 2014

(54) METHOD AND SYSTEM FOR ESTABLISHING SECURITY CONNECTION BETWEEN SWITCH EQUIPMENTS

(75) Inventors: Qin Li, Shaanxi (CN); Jun Cao, Shaanxi (CN); Li Ge, Shaanxi (CN); Manxia Tie, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

(21) Appl. No.: 13/515,394

(22) PCT Filed: May 26, 2010

(86) PCT No.: PCT/CN2010/073253
§ 371 (c)(1),
(2), (4) Date: Jun. 12, 2012

(87) PCT Pub. No.: WO2011/072513
PCT Pub. Date: Jun. 23, 2011

(65) Prior Publication Data
US 2012/0254617 A1    Oct. 4, 2012

(30) Foreign Application Priority Data
Dec. 18, 2009  (CN) .......................... 2009 1 0219575

(51) Int. Cl.
H04L 29/06    (2006.01)
H04K 1/00     (2006.01)
H04L 9/08     (2006.01)
H04W 12/04    (2009.01)
H04L 9/32     (2006.01)

(52) U.S. Cl.
CPC ............ *H04L 9/0838* (2013.01); *H04L 9/0891* (2013.01); *H04L 63/06* (2013.01); *H04L 2209/80* (2013.01); *H04W 12/04* (2013.01)
USPC ........... 713/151; 713/171; 380/255; 380/273; 380/283

(58) Field of Classification Search
CPC ..... H04L 9/0838; H04L 9/0891; H04L 63/06; H04L 2209/80; H04W 12/04
USPC ................... 713/151, 171; 380/255, 273, 283
See application file for complete search history.

(56) References Cited

U.S. PATENT DOCUMENTS 4,965,804 A * 10/1990 Trbovich et al. .............. 713/153
(Continued)

FOREIGN PATENT DOCUMENTS

CN    1668005 A    9/2005
(Continued)

OTHER PUBLICATIONS

Altunbasak, Hayriye, et al. "Securing layer 2 in local area networks." Networking-ICN 2005. Springer Berlin Heidelberg, 2005. 699-706.*
(Continued)

*Primary Examiner* — Michael Simitoski
(74) *Attorney, Agent, or Firm* — Harness, Dickey & Pierce, P.L.C.

(57) ABSTRACT

A method and a system for establishing a security connection between switch equipments are disclosed in the present invention. The system includes the first switch equipment and the second switch equipment; the first switch equipment sends the switch key negotiation activation packet and the switch key negotiation response packet to the second switch equipment; the second switch equipment sends the switch key negotiation request packet to the first switch equipment. The embodiments of the present invention provide a security policy for data security transmission between switch equipments by establishing shared switch key between each two switch equipments, thus guaranteeing the confidentiality of the data transmission process between switch equipments in the data link layer. The calculation burden of switch equipment and the delay of the data packets transmitted from the transmission end to the reception end can be reduced and the efficiency of network transmission can be improved.

17 Claims, 2 Drawing Sheets

(56) References Cited

U.S. PATENT DOCUMENTS

| | | | |
|---|---|---|---|
| 5,410,602 A * | 4/1995 | Finkelstein et al. | 380/281 |
| 6,092,191 A * | 7/2000 | Shimbo et al. | 713/153 |
| 6,240,514 B1 * | 5/2001 | Inoue et al. | 713/153 |
| 7,203,834 B1 * | 4/2007 | Benayoun et al. | 713/168 |
| 7,392,378 B1 * | 6/2008 | Elliott | 713/153 |
| 8,225,092 B2 | 7/2012 | Lal et al. | |
| 2003/0084304 A1 * | 5/2003 | Hon et al. | 713/185 |
| 2008/0028225 A1 * | 1/2008 | Eckert et al. | 713/182 |
| 2008/0162937 A1 * | 7/2008 | Kohlenberg et al. | 713/171 |
| 2009/0013175 A1 * | 1/2009 | Elliott | 713/154 |
| 2009/0067623 A1 | 3/2009 | Lei et al. | |
| 2009/0217032 A1 * | 8/2009 | Guan | 713/154 |
| 2009/0300358 A1 * | 12/2009 | Pang et al. | 713/171 |
| 2010/0023768 A1 * | 1/2010 | Lin et al. | 713/171 |
| 2010/0293370 A1 | 11/2010 | Xiao et al. | |
| 2011/0055561 A1 * | 3/2011 | Lai et al. | 713/168 |
| 2012/0124373 A1 * | 5/2012 | Dangoor et al. | 713/168 |

FOREIGN PATENT DOCUMENTS

| | | | | |
|---|---|---|---|---|
| CN | 1937489 A | | 3/2007 | |
| CN | 101106454 A | | 1/2008 | |
| CN | 101159543 A | | 4/2008 | |
| CN | 101232378 A | | 7/2008 | |
| CN | 101521580 A | | 9/2009 | |
| CN | 101527905 A | | 9/2009 | |
| EP | 1852999 A1 | | 11/2007 | |
| EP | 1852999 A1 * | 11/2007 | | H04L 9/08 |
| JP | 2008530919 A | | 8/2008 | |

OTHER PUBLICATIONS

Khan, Moazzam, Fereshteh Amini, and Jelena Mišić. "Key exchange in 802.15. 4 networks and its performance implications." Mobile Ad-hoc and Sensor Networks. Springer Berlin Heidelberg, 2006. 497-508.*

O'Connor, Don. "Secure Ethernet Service." National Fiber Optic Engineers Conference. Optical Society of America, 2005.*

Stallings, William. Cryptography and Network Security, Principles and Practice (Second Edition). Prentice-Hall, 1999.*

Tsaur, W-J., and S-J. Horng. "Establishing secure Ethernet LANs using intelligent switching hubs in Internet environments." The Computer Journal 41.2 (1998): 125-133.*

IEEE Std 802.3™—2005 (Revision of IEEE Std 802.3-2002 including all approved amendments); IEEE Standard for Information technology—Telecommunications and information exchange between systems—Local and metropolitan area networks—Specific requirements. Part 3: Carrier sense multiple access with collision detection (CSMA/CD) access method and physical layer specifications. IEEE Computer Society, IEEE, New York, NY, USA, Dec. 9, 2005.

IEEE Std 802.1AE™—2006—IEEE Standard for Local and metropolitan area networks—Media Access Control (MAC) Security. IEEE Computer Society, IEEE, New York, NY, USA, Aug. 18, 2006.

International Search Report (in Chinese with English translation) for PCT/CN2010/073253, mailed Sep. 23, 2010.

D. W. Davies and W. L. Price. "Security for Computer Networks." 1984. John Wiley & Sons, Ltd.

Eiji Okamoto. "Achieve Clear the Password Information Society Technology. Centralized Key Distribution Method." vol. 23, No. 12. Nov. 1, 1991.

* cited by examiner

METHOD AND SYSTEM FOR ESTABLISHING SECURITY CONNECTION BETWEEN SWITCH EQUIPMENTS

This application is a National Stage application of PCT international application PCT/CN2010/073253, filed on May 26, 2010 which claims the priority of Chinese patent application No. 200910219575.1, entitled "METHOD AND SYSTEM FOR ESTABLISHING SECURITY CONNECTION BETWEEN SWITCH EQUIPMENTS", filed with the Chinese Patent Office on Dec. 18, 2009, both of which are incorporated herein by reference in their entirety.

FIELD OF THE INVENTION

The present invention relates to the field of network communication technique, and in particular to a method and system for establishing security connection between switch equipment.

BACKGROUND OF THE INVENTION

The wired local area network is generally a broadcast-type network, in which data sent by one node can be received by all the other nodes. Individual nodes on the network share the channel, which causes great potential safety hazard to the network. An attacker can capture all the data packets on the network as long as he/she accesses the network to monitor, and thus stealing importance information.

The Local Area Network (LAN) defined according to the existing national standard does not provide the method for security access and data secrecy. The user can access the equipment and the resource in the LAN as long as he/she can access the LAN control equipment, such as the switch equipment in the LAN. This did not cause significant potential safety hazard in the application environment of the early-stage wired enterprise LAN; however, with the development of the network on a large scale, the requirement on the privacy of the information by the user is becoming higher and higher, and then it is necessary to realize data security in the data link layer.

In a wired LAN, IEEE realizes the security of the data link layer by performing security enhancement on IEEE 802.3. IEEE 802.1AE provides a data encryption protocol for protection of the Ethernet data, and realizes the safe transmission of information between network entities by employing a safety measure of hop-by-hop encryption. However, this safety measure brings heavy calculation load to the switch equipment in the LAN, and is prone to inducing attack on the switch equipment by an attacker; and the delay of transmitting a data packet from a sender to a receiver will be increased and the efficiency of network transmission is reduced.

SUMMARY OF THE INVENTION

To solve the technical problem existing in the prior art, an embodiment of the present invention provides a method and system for establishing security connection between switch equipment, in which a security policy is provided for data secrecy transmission between switch equipment by establishing a shared switch key between each two switch equipment, thus guaranteeing the confidentiality of data transmission process between switch equipment in the data link layer. Moreover, in this security mechanism, it is unnecessary for the switch equipment to perform the process of decryption and re-encryption on all the data packets to be transmitted, and most of the data packets to be transmitted can be transmitted directly. Thus, as compared with IEEE 802.1AE technique, the calculation load of the switch equipment can be decreased, the delay of transmitting data from a sender to a receiver can be reduced, and efficiency of network transmission can be improved.

An embodiment of the present invention provides a method for establishing security connection between switch equipment, and the method includes:
1) sending, by a first switch equipment, a switch key negotiation activation packet to a second switch equipment, the switch key negotiation activation packet comprising an $N_{SW1}$ field; wherein
   the $N_{SW1}$ field indicates a switch key negotiation identifier, the value of which is a random number generated by the first switch equipment during a first-time switch key negotiation process between the first switch equipment and the second switch equipment, and is equal to the value of a switch key negotiation identifier calculated during the last-time switch key negotiation process during a switch key negotiation updating process;
2) constructing, by the second switch equipment, a switch key negotiation request packet and sending the switch key negotiation request packet to the first switch equipment, after receiving the switch key negotiation activation packet sent by the first switch equipment;
3) constructing, by the first switch equipment, a switch key negotiation response packet and sending the switch key negotiation response packet to the second switch equipment, after receiving the switch key negotiation request packet sent by the second switch equipment; and
4) confirming, by the second switch equipment, that a switch key obtained by the first switch equipment is consistent with that of the second switch equipment, after receiving the switch key negotiation response packet sent by the first switch equipment.

An embodiment of the present invention further provides a system for establishing security connection between switch equipment, and the system includes: a first switch equipment adapted for sending a switch key negotiation activation packet and a switch key negotiation response packet to a second switch equipment and receiving a switch key negotiation request packet sent by the second switch equipment; and the second switch equipment adapted for receiving the switch key negotiation activation packet and the switch key negotiation response packet sent by the first switch equipment and sending the switch key negotiation request packet to the first switch equipment.

The embodiment of the present invention has the following advantages. After a shared unicast key has been established between adjacent switch equipment based on a security mechanism such as pre-distribution, a switch key is established between every two switch equipment, and this key is used for the data security communication process between the switch equipment, and provides a security policy for data security transmission between the switch equipment, thus guaranteeing the confidentiality of data transmission process between the switch equipment in the data link layer and improving the security of the network.

DETAILED DESCRIPTION OF THE INVENTION

A unicast key defined in an embodiment of the present invention contains two parts: a Protocol Data Key (PDK) and a User Data Key (UDK), where the PDK is used for protecting the confidentiality of the key data in the protocol data and the integrity of the protocol data between the equipment, the UDK is used for protecting the confidentiality and integrity of the user data between the equipment; and the switch key includes a Switch Protocol Data Key (SW-PK) and a Switch User Data Key (SW-UDK). Two components of the switch key correspond respectively to two parts of the unicast key.

In practical application, the structures of the PDK and the UDK or the structures of the SW-PDK and the SW-UDK can vary with block encryption modes, and the key for protecting the confidentiality and integrity of the data can be the same or different.

Figure 1:
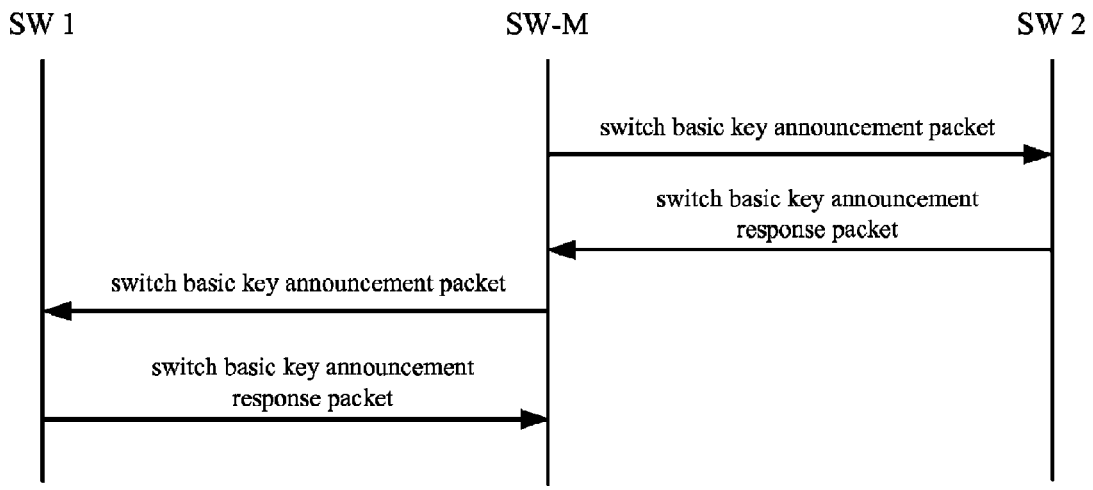
FIG. 1 is a schematic diagram of a switch basic key announcement process in an embodiment of the present invention.
Figure 2:
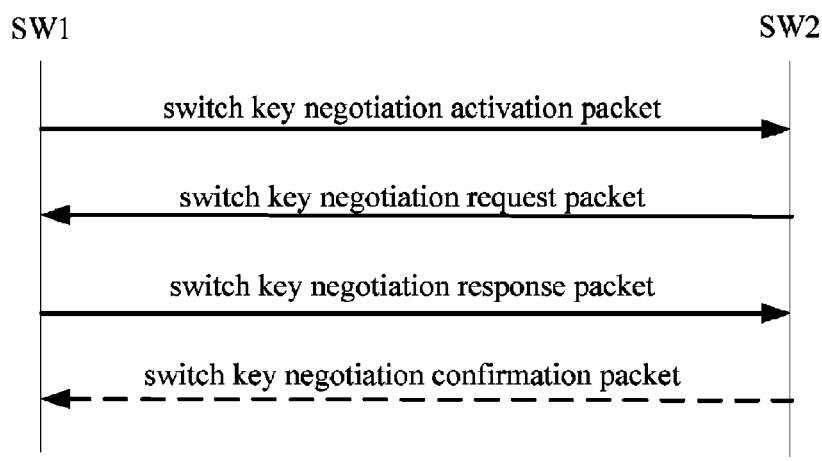
FIG. 2 is a schematic diagram of a switch key negotiation process in an embodiment of the present invention.
Figure 3:
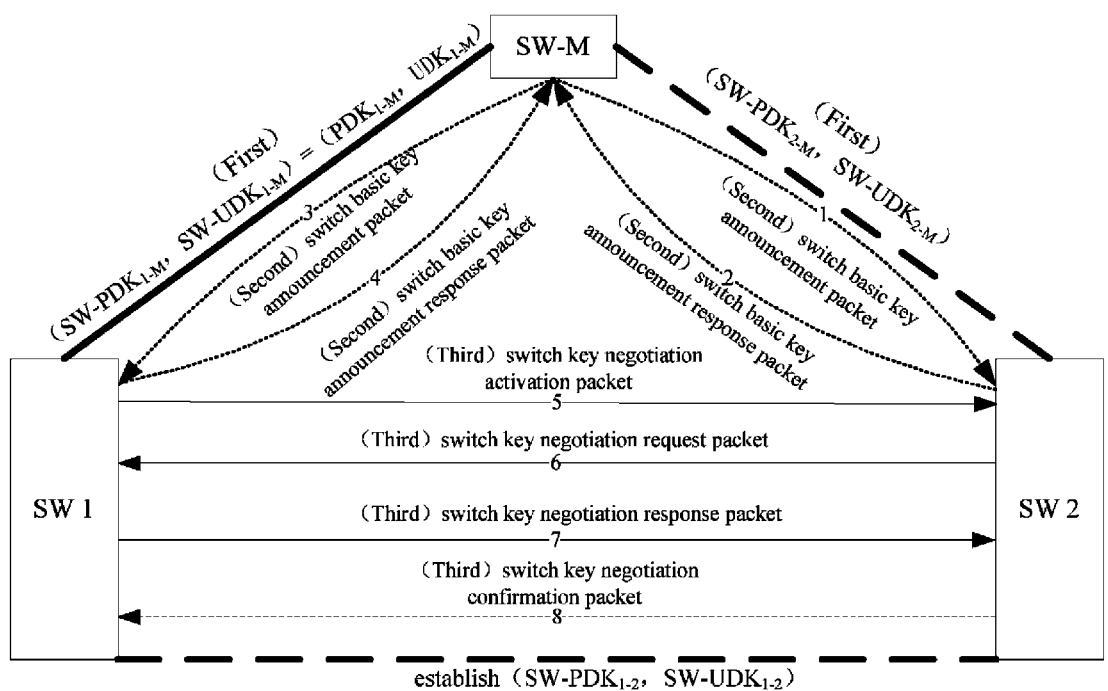
FIG. 3 is a schematic diagram of a process of establishing a switch key between switch equipment that are not adjacent in an embodiment of the present invention.

Referring to FIGS. 1 to 3, an embodiment of the present invention provides a method and system for establishing security connection between switch equipment, by which a shared switch key can be established between every two switch equipment in a local area network.

For convenient description, a first switch equipment is indicated by a switching equipment SW1, a second switch equipment is indicated by a switch equipment SW2, and a third switch equipment is indicated by a switch equipment SW-M, in the following description.

In the method according to an embodiment of the present invention, the switch key between the switch equipment SW1 and the switch equipment SW2 is the unicast key between them, if the switch equipment SW1 and the switch equipment SW2 are adjacent to each other. If the switch equipment SW1 and the switch equipment SW2 are not adjacent to each other, the establishment of the switch key between them includes two processes: a switch basic key announcement process and a switch key negotiation process. In the case that the switch equipment SW1 and the switch equipment SW2 are not adjacent to each other, the establishment of the switch, key between the switch equipment SW1 and SW2 can be implemented by performing the switch key negotiation process, if a Switch Basic Key (SW-BK) has been established between the switch equipment SW1 and SW2 based on a security mechanism, such as pre-distribution (which is not defined and limited in the embodiment of the present invention); and the establishment of the switch key between the switch equipment SW1 and SW2 can be implemented by performing the switch basic key announcement process at first and then performing the switch key negotiation process, if there is no a shared switch basic key between the switch equipment SW1 and SW2.

Because the unicast key between the adjacent switch equipment is the switch key between them, the switch key between the adjacent switch equipment is established when the shared unicast key between them is established based on a security mechanism such as pre-distribution (which is not defined and limited in the embodiment of the present invention). There can only be one or two switch equipment in the network initially, and then the network will be extended gradually. Therefore, when the switch equipment SW1 accesses the current network by the switch equipment SW-M in the current network, the switch key between the switch equipment SW1 and SW-M is established when the unicast key between the switch equipment SW1 and SW-M is established based on a security mechanism such as pre-distribution, and the switch key has also been established between every two of all the other switch equipment that are not adjacent in the current network. At this time, the switch key between the switch equipment SW1 and any other switch equipment (such as the switch equipment SW2) in the current network can be established by the switch equipment SW-M. The establishment process of the switch key between the switch equipment SW1 and the switch equipment SW2 is the switch basic key announcement process and the switch key negotiation process described in the embodiment of the present invention, and the specific steps are as follows.

1) Switch Basic Key Announcement Process:

The switch basic key announcement process is to establish a switch basic key between the switch equipment SW1 and the switch equipment SW2 that are not adjacent to each other in the network, and this key is used in the switch key negotiation process, for establishing a shared switch key between the switch equipment SW1 and SW2.

Referring to FIG. 1, the switch basic key announcement process is that: the switch equipment SW-M generates a random number as the switch basic key between the switch equipment SW2 and the switch equipment SW1, and this switch basic key is announced to the switch equipment SW2 and the switch equipment SW1 successively. This process includes four steps totally: the switch basic key announcement of the switch equipment SW-M for the switch equipment SW2, the switch basic key announcement response of the switch equipment SW2, the switch basic key announcement of the switch equipment SW-M for the switch equipment SW1 and the switch basic key announcement response of the switch equipment SW1, in which the switch basic key announcement of the switch equipment SW-M for the switch equipment SW1 and the switch basic key announcement response of the switch equipment SW1 are similar to the switch basic key announcement of the switch equipment SW-M for the switch equipment SW2 and the switch basic key announcement response of the switch equipment SW2, and the only difference is the SW-PDK used by the switch basic key in the announcements.

1.1) Switch basic key announcement of the switch equipment SW-M for the switch equipment SW2

After the switch equipment SW1 accesses the network through the switch equipment SW-M successfully, a shared unicast key (a protocol data key $PDK_{1-M}$, and a user data key $UDK_{1-M}$) has been established between the switch equipment SW1 and the switch equipment SW-M based on a security mechanism such as pre-distribution (which is not defined and limited in the embodiment of the present invention), and this key directly serves as the switch key (a switch protocol data key $SW\text{-}PDK_{1-M}$, and a switch user data key $SW\text{-}UDK_{1-M}$) between them. According to the above description, there already exists the switch key (the switch protocol data key $SW\text{-}PDK_{2-M}$, and the switch user data key $SW\text{-}UDK_{2-M}$) between the switch equipment SW-M and the switch equipment SW2. To establish the switch basic key $SW\text{-}BK_{1-2}$ between the switch equipment SW1 and the switch equipment SW2, the switch equipment SW-M firstly generates a random number as the switch basic key $SW\text{-}BK_{1-2}$ between the switch equipment SW1 and the switch equipment SW2, constructs a switch basic key announcement packet and sends the switch basic key announcement packet to the switch equipment SW2.

The main content of the switch basic key announcement packet includes:

| KN2 | $E_2$ | MIC1 |
|---|---|---| where

KN2 field indicates the key announcement identifier of the switch equipment SW2, the value of which is an integral number and the initial value of which is a fixed value, and the value of the KN2 field is increased by 1 or a fixed value every time the switch basic key is announced to the switch equipment SW2;

$E_2$ field indicates the key-encrypted data which is the data obtained by the switch equipment SW-M encrypting the switch basic key SW-BK$_{1-2}$ with the switch protocol data key SW-PDK$_{2-M}$ between the switch equipment SW2 and the switch equipment SW-M; and MIC1 field indicates the message identification code which is a hash value obtained by the switch equipment SW-M performing hash function calculation on the fields in the switch basic key announcement packet other than the MIC1 field by using the switch protocol data key SW-PDK$_{2-M}$ between the switch equipment SW2 and the switch equipment SW-M.

1.2) Switch basic key announcement response of the switch equipment SW2

The switch equipment SW2 performs the following processes after receiving the switch basic key announcement packet sent by the switch equipment SW-M.

1.2.1) checking to determine whether the KN2 field increases monotonically, discarding this packet if not; else performing a step 1.2.2);

1.2.2) verifying whether the MIC1 field is correct by using the switch protocol data key SW-PDK$_{2-M}$ between the switch equipment SW-M and the switch equipment SW2, discarding this packet if the MIC1 field is incorrect; else, performing a step 1.2.3);

1.2.3) decrypting the $E_2$ field by using the switch protocol data key SW-PDK$_{2-M}$ between the switch equipment SW-M and the switch equipment SW2, so as to obtain the switch basic key SW-BK$_{1-2}$ between the switch equipment SW1 and the switch equipment SW2; and 1.2.4) saving the value of the key announcement identifier KN2 field at this time, constructing a switch basic key announcement response packet and sending the switch basic key announcement response packet to the switch equipment SW-M.

The main content of the switch basic key announcement response packet includes:

| KN2 | MIC2 |
|---|---| where

KN2 field indicates the key announcement identifier, the value of which is equal to the value of the KN2 field in the received switch basic key announcement packet; and MIC2 field indicates the message identification code, and is a hash value obtained by the switch equipment SW2 by performing hash function calculation on the fields in the switch basic key announcement response packet other than the MIC2 field by using the switch protocol data key SW-PDK$_{2-M}$ between the switch equipment SW-M and the switch equipment SW2.

1.3) the switch basic key announcement of the switch equipment SW-M for the switch equipment SW1

The switch equipment SW-M performs the following processes after receiving the switch basic key announcement response packet sent by the switch equipment SW2.

1.3.1) comparing to determine whether the value of the KN2 field is consistent with the value of the KN2 field in the switch basic key announcement packet sent to the switch equipment SW2 previously, discarding this packet if not consistent; else, performing a step 1.3.2);

1.3.2) verifying whether the MIC2 field is correct by using the switch protocol data key SW-PDK$_{2-M}$ between the switch equipment SW2 and the switch equipment SW-M, discarding this packet if the MIC2 field is incorrect; else saving the value of the key announcement identifier KN2 field at this time, finishing the announcement of the switch basic key SW-BK$_{1-2}$ between the switch equipment SW1 and the switch equipment SW2 to the switch equipment SW2, and performing a step 1.3.3); and 1.3.3) constructing a switch basic key announcement packet according to the switch basic key SW-BK$_{1-2}$ that is previously announced to the switch equipment SW2, and sending the switch basic key announcement packet to the switch equipment SW1.

The main content of the switch basic key announcement packet includes:

| KN1 | $E_1$ | MIC3 |
|---|---|---| where

KN1 field indicates the key announcement identifier of the switch equipment SW1, the value of which is an integral number and an initial value of which is a fixed value, the value of the KN1 field is increased by 1 or a fixed value every time the switch basic key announcement is performed on the switch equipment SW1;

$E_1$ field indicates the key-encrypted data, and is obtained by the switch equipment SW-M encrypting the switch basic key SW-BK$_{1-2}$ with the switch protocol data key SW-PDK$_{1-M}$ between the switch equipment SW1 and the switch equipment SW-M, in which the switch basic key SW-BK$_{1-2}$ is the same as the switch basic key SW-BK$_{1-2}$ announced to the switch equipment SW2; and MIC3 field indicates the message identification code, and is a hash value obtained by the switch equipment SW-M performing hash function calculation on the fields in the switch basic key announcement packet other than the MIC3 field by using the switch protocol data key SW-PDK$_{1-M}$ between the switch equipment SW1 and the switch equipment SW-M.

1.4) the switch basic key announcement response of the switch equipment SW1

The switch equipment SW1 performs the following processes after receiving the switch basic key announcement packet sent by the switch equipment SW-M.

1.4.1) checking to determine whether the KN1 field increases monotonically, discarding this packet if not; else performing a step 1.4.2);

1.4.2) verifying whether the MIC3 field is correct by using the switch protocol data key SW-PDK$_{1-M}$ between the switch equipment SW-M and the switch equipment SW1, discarding this packet if the MIC3 field is incorrect; else performing a step 1.4.3);

1.4.3) decrypting the $E_1$ field by using the switch protocol data key SW-PDK$_{1-M}$ between the switch equipment SW-M and the switch equipment SW1, so as to obtain the switch basic key SW-BK$_{1-2}$ between the switch equipment SW2 and the switch equipment SW1; and 1.4.4) saving the value of the key announcement identifier KN1 field at this time, constructing a switch basic key announcement response packet and sending the switch basic key announcement response packet to the switch equipment SW-M.

The main content of the switch basic key announcement response packet includes:

| KN1 | MIC4 |
| --- | --- | where

KN1 field indicates the key announcement identifier of the switch equipment SW1, the value of which is equal to the value of the KN1 field in the received switch basic key announcement packet; and MIC4 field indicates the message identification code, and is a hash value obtained by the switch equipment SW1 performing hash function calculation on the fields in the switch basic key announcement response packet other than the MIC4 field by using the switch protocol data key SW-PDK$_{1-M}$ between the switch equipment SW-M and the switch equipment SW1.

1.5) performing the following processes by the switch equipment SW-M, after receiving the switch basic key announcement response packet sent by the switch equipment SW1.

1.5.1) comparing to determine whether the value of the KN1 field is consistent with the value of the KN1 field in the switch basic key announcement packet sent to the switch equipment SW1 previously, discarding this packet if not consistent; else performing a step 1.5.2); and 1.5.2) verifying whether the MIC4 field is correct by using the switch protocol data key SW-PDK$_{1-M}$ between the switch equipment SW1 and the switch equipment SW-M; if the MIC4 field is correct, saving the value of the key announcement identifier KN1 field at this time, finishing the announcement of the switch basic key SW-BK$_{1-2}$ between the switch equipment SW1 and the switch equipment SW2 to the switch equipment SW1, i.e., finishing the establishment of the switch basic key between the switch equipment SW1 and the switch equipment SW2; and discarding this packet if the MIC4 field is incorrect.

In practical implementation, an announcement process will be initiated again according to a re-announcement mechanism, if the announcement for the switch equipment SW1 and the switch equipment SW2 is unsuccessful. In the case that the switch equipment SW1 accesses the network through the switch equipment SW-M, if the announcement of the switch equipment SW-M for the switch equipment SW2 had not succeeded until the maximum re-announcement time has been exceeded, it is considered that it is unable to establish a consistent switch basic key for the switch equipment SW1 and the switch equipment SW2 and the protocol is ended; if the announcement for the switch equipment SW2 has succeeded and the announcement for the switch equipment SW1 had not succeeded until the maximum re-announcement time has been exceeded, it is considered that it is unable to establish a consistent switch basic key for the switch equipment SW1 and the switch equipment SW2, it is necessary to announce the switch equipment SW2 to withdraw the switch basic key that is established between the switch equipment SW1 and the switch equipment SW2, i.e., the switch equipment SW-M constructs a switch basic key announcement packet for the switch equipment SW2 to announce the switch equipment SW2 to delete the switch basic key that has been established between the switch equipment SW1 and the switch equipment SW2.

If the switch equipment SW-M needs to update or withdraw the switch basic key between the switch equipment SW1 and the switch equipment SW2, a switch basic key announcement packet can be constructed and sent to the switch equipment SW2 or the switch equipment SW1, for requesting the switch equipment SW2 or the switch equipment SW1 to update or delete the switch basic key between the switch equipment SW1 and the switch equipment SW2. The process of updating or withdrawing the switch basic key is the same as the process of establishing the switch basic key. Particularly, an identifier field for distinguishing can be added in each packet during the above switch basic key announcement process, for identifying the process of establishing, withdrawing and updating the switch basic key between the switch equipment SW1 and the switch equipment SW2 through the switch equipment SW-M.

2) The Switch Key Negotiation Process

The switch key negotiation process is that the switch equipment SW1 and the switch equipment SW2 use the switch basic key SW-BK$_{1-2}$ between them to negotiate the shared switch key (the switch protocol data key SW-PDK$_{1-2}$ and the switch user data key SW-UDK$_{1-2}$). Referring to FIG. 2, the switch key negotiation process includes four packets: a switch key negotiation activation packet, a switch key negotiation request packet, a switch key negotiation response packet and a switch key negotiation confirmation packet. The switch key negotiation confirmation packet is optional, i.e., in practice, the switch equipment SW2 can or can not send a switch key negotiation confirmation packet to the switch equipment SW1, and the specific implementation strategy is not defined in the present invention. The specific switch key negotiation processes are as follow.

2.1) sending, by the switch equipment SW1, a switch key negotiation activation packet to the switch equipment SW2 when a switch basic key SW-BK$_{1-2}$ is configured for the switch equipment SW1 and the switch equipment SW2, which is prepared for establishing the switch key (the switch protocol data key SW-PDK$_{1-2}$ and the switch user data key SW-UDK$_{1-2}$), or when the switch basic key SW-BK$_{1-2}$ has been established by the switch basic key announcement process, the switch equipment SW1 sends a switch key negotiation activation packet to the switch equipment SW2 to start the switch key negotiation process.

The main content of the switch key negotiation activation packet includes:

| N$_{SW1}$ |
| --- | where

N$_{SW1}$ field indicates switch key negotiation identifier, the value of which is a random number generated by the switch equipment SW1 if this switch key negotiation process is the first-time switch key negotiation process between the switch equipment SW1 and the switch equipment SW2, and is the value of the switch key negotiation identifier calculated during the last-time switch key negotiation process if this switch key negotiation process is a switch key negotiation updating process.

2.2) sending, by the switch equipment SW2, a switch key negotiation request packet to the switch equipment SW1

The switch equipment SW2 performs the following processes after receiving the switch key negotiation activation packet sent by the switch equipment SW1:

2.2.1) in the case that this switch key negotiation process is the switch key negotiation updating process, checking, by the switch equipment SW2, to determine whether the value of the switch key negotiation identifier $N_{SW1}$ field in the switch key negotiation activation packet is consistent with the value of the switch key negotiation identifier calculated during the last-time switch key negotiation process, discarding this packet if not consistent; else performing a step 2.2.2); in the case that this switch key negotiation process is the first-time switch key negotiation process, performing a step 2.2.2) directly;

2.2.2) generating an inquiry $N_{SW2}$, calculating a switch key (the switch protocol data key SW-PDK$_{1-2}$ and the switch user data key SW-UDK$_{1-2}$) between the switch equipment SW1 and the switch equipment SW2 and a switch key negotiation identifier $N_{SW1}$ for the next switch key negotiation process by using a switch basic key SW-BK$_{1-2}$ between the switch equipment SW1 and the switch equipment SW2, the switch key negotiation identifier $N_{SW1}$ and the inquiry $N_{SW2}$ generated by the switch equipment SW2, and saving the calculated switch key and the switch key negotiation identifier $N_{SW1}$ for the next switch key negotiation process; and 2.2.3) calculating a message identification code MIC5 locally by using the switch protocol data key SW-PDK$_{1-2}$ in the calculated switch key, constructing a switch key negotiation request packet and sending the switch key negotiation request packet to the switch equipment SW1.

The main content of the switch key negotiation request packet includes:

| $N_{SW2}$ | $N_{SW1}$ | MIC5 |
| --- | --- | --- | where the $N_{SW2}$ field indicates the inquiry of the switch equipment SW2, the value of which is a random number generated by the switch equipment SW2;

the $N_{SW1}$ field indicates the switch key negotiation identifier, the value of which directly depends on the value of the $N_{SW1}$ field in the switch key negotiation activation packet if this switch key negotiation process is the first-time switch key negotiation process between the switch equipment SW1 and the switch equipment SW2, and is equal to the value of the switch key negotiation identifier calculated during the last-time switch key negotiation process if this switch key negotiation process is the switch key negotiation updating process; and the MIC5 field indicates the message identification code, and is a hash value obtained by the switch equipment SW2 performing hash function calculation on the fields in the switch key negotiation request packet other than the MIC5 field by using the switch protocol data key SW-PDK$_{1-2}$ in the calculated switch key.

2.3) sending, by the switch equipment SW1, a switch key negotiation response packet to the switch equipment SW2

The switch equipment SW1 performs the following processes after receiving the switch key negotiation request packet sent by the switch equipment SW2:

2.3.1) in the case that this switch key negotiation process is the switch key negotiation updating process, checking to determine whether the value of $N_{SW1}$ field in the switch key negotiation request packet is consistent with the value of the switch key negotiation identifier calculated during the last-time switch key negotiation process, discarding this packet if not consistent, else performing a step 2.3.2); in the case that this switch key negotiation process is the first-time switch key negotiation process, checking to determine whether the value of $N_{SW1}$ field in the switch key negotiation request packet is consistent with the value of $N_{SW1}$ field in the switch key negotiation activation packet, discarding this switch key negotiation request packet if not consistent, else performing a step 2.3.2);

2.3.2) calculating a switch key (the switch protocol data key SW-PDK$_{1-2}$ and the switch user data key SW-UDK$_{1-2}$) between the switch equipment SW2 and the switch equipment SW1 and a switch key negotiation identifier $N_{SW1}$ for the next switch key negotiation process by using the switch basic key SW-BK$_{1-2}$ between the switch equipment SW1 and SW2, the switch key negotiation identifier $N_{SW1}$ and the inquiry $N_{SW2}$ of the switch equipment SW2, and saving the switch key between the switch equipment SW1 and SW2 and the switch key negotiation identifier $N_{SW1}$ for the next switch key negotiation process;

2.3.3) verifying whether the MIC5 field in the switch key negotiation request packet is correct by using the switch protocol data key SW-PDK$_{1-2}$ in the calculated switch key, discarding this switch key negotiation request packet if the MIC5 field is incorrect, else performing a step 2.3.4); and 2.3.4) calculating a message identification code MIC6 locally by using the switch protocol data key SW-PDK$_{1-2}$ in the calculated switch key, constructing a switch key negotiation response packet and sending the switch key negotiation response packet to the switch equipment SW2.

The main content of the switch key negotiation response packet includes:

| $N_{SW2}$ | MIC6 |
| --- | --- | where $N_{SW2}$ field indicates the inquiry of the switch equipment SW2, the value of which is the random number generated by the switch equipment SW2, and equal to the value of the $N_{SW2}$ field in the switch key negotiation request packet; and MIC6 field indicates the message identification code, and is a hash value obtained by the switch equipment SW1 performing hash function calculation on the fields in the switch key negotiation response packet other than the MIC6 field, or on the fields in the switch key negotiation response packet other than the MIC6 field and the calculated switch key negotiation identifier $N_{SW1}$ for the next switch key negotiation process by using the switch protocol data key SW-PDK$_{1-2}$ in the calculated switch key.

2.4) confirming, by the switch equipment SW2, the switch key of the switch equipment SW1

The switch equipment SW2 performs the following processes after receiving the switch key negotiation response packet sent by the switch equipment SW1:

2.4.1) checking to determine whether the value of the $N_{SW2}$ field is consistent with the value of the $N_{SW2}$ field in the switch key negotiation request packet sent previously, discarding this switch key negotiation response packet if not consistent, else performing a step 2.4.2); and 2.4.2) verifying whether the MIC6 field in the switch key negotiation response packet is correct by using the switch protocol data key SW-PDK$_{1-2}$ in the calculated switch key, discarding this switch key negotiation response packet if the MIC6 field is incorrect, else confirming, by the switch equipment SW2, that the switch key obtained by the switch equipment SW1 is consistent with that obtained by the switch equipment SW2.

Referring to FIG. 2, after the step 2.4), the flow of the embodiment of the present invention further includes the following steps:

2.5) sending, by the switch equipment SW2, a switch key negotiation confirmation packet to the switch equipment SW1

If the switch equipment SW2 needs to construct the switch key negotiation confirmation packet, the switch equipment SW2 locally calculates a message identification code MIC7 by using the switch protocol data key SW-PDK$_{1-2}$ in the calculated switch key, constructs a switch key negotiation confirmation packet and sends the switch key negotiation confirmation packet to the switch equipment SW1. The switch key negotiation confirmation packet is optional, i.e., in practical application, the switch equipment SW2 can or can not send a switch key negotiation confirmation packet to the switch equipment SW1, the specific implementation strategy is not defined in the present invention.

The main content of the switch key negotiation confirmation packet includes:

| N$_{SW1}$ | MIC7 |
|---|---| where

N$_{SW1}$ field indicates the switch key negotiation identifier, the value of which is equal to the value of the N$_{SW1}$ field in the switch key negotiation request packet; and MIC7 field indicates the message identification code, and is a hash value obtained by the switch equipment SW2 performing hash function calculation on the fields in the switch key negotiation confirmation packet other than the MIC7 field, or on the fields in the switch key negotiation confirmation packet other than the MIC7 field and the calculated switch key negotiation identifier N$_{SW1}$ for the next switch key negotiation process, by using the switch protocol data key SW-PDK$_{1-2}$ in the calculated switch key.

2.6) confirming, by the switch equipment SW1, the switch key of the switch equipment SW2

The switch equipment SW1 performs the following processes after receiving the switch key negotiation confirmation packet sent by the switch equipment SW2:

2.6.1) checking to determine whether the value of the N$_{SW1}$ field is consistent with the value of the N$_{SW1}$ field in the received switch key negotiation request packet, discarding the switch key negotiation confirmation packet if not consistent, else performing a step 2.6.2); and 2.6.2) verifying whether the MIC7 field in the switch key negotiation confirmation packet is correct by using the switch protocol data key SW-PDK$_{1-2}$ in the calculated switch key, discarding this switch key negotiation confirmation packet if the MIC7 field is incorrect, and confirming that the switch equipment SW2 has obtained the switch key that is consistent with the switch key of the switch equipment SW1 if the MIC7 field is correct.

The method for establishing security connection between switch equipment mentioned above further has the following characteristics.

If the switch equipment SW1 or the switch equipment SW2 needs to update or withdraw the switch key between the switch equipment SW1 and the switch equipment SW2, the switch equipment SW1 or the switch equipment SW2 can construct a switch key negotiation activation packet and send the switch key negotiation activation packet to the switch equipment SW2 or the switch equipment SW1, for requesting the switch equipment SW2 or the switch equipment SW1 to update or delete the switch key between the switch equipment SW1 and the switch equipment SW2; the process of updating or withdrawing the switch key is the same as the process of negotiating the switch key, and in the practical application, an identifier field for distinguishing can be added in each packet during the above switch key negotiation process, for identifying the processes of negotiating, withdrawing and updating of the switch key between the switch equipment SW1 and the switch equipment SW2.

As shown in FIG. 3, the switch equipment SW-M is the switch equipment in the current network; the switch equipment SW1 is the switch equipment that is to access the network through the switch equipment SW-M; and the switch equipment SW2 is any one of the switch equipment in the current network other than the switch equipment SW-M.

According to the previous description, there exists a switch key between every two switch equipment of all the switch equipment in the current network. Therefore, there exists a switch key between the switch equipment SW-M and the switch equipment SW2, i.e., the "(first) (SW-PDK$_{2-M}$, SW-UDK$_{2-M}$)" between the switch equipment SW-M and the switch equipment SW2 in FIG. 3.

When the switch equipment SW1 accesses the current network through the SW-M, a unicast key is established between the switch equipment SW1 and the switch equipment SW-M based on a security mechanism such as pre-distribution, and the unicast key is the switch key between them, i.e., the "(first) (SW-PDK$_{1-M}$, SW-UDK$_{1-M}$)= (PDK$_{1-M}$, UDK$_{1-M}$)" between the switch equipment SW-M and the switch equipment SW1 as shown in FIG. 3.

Then the switch equipment SW1 needs to establish switch key with all the other switch equipment in the current network. Taking the switch equipment SW2 as an example, if a shared switch basic key is not configured for the switch equipment SW1 and the switch equipment SW2, a switch key needs to be established between them by the eight packet exchange processes in FIG. 3, i.e., the "(first)" and "(second)" processes in FIG. 3; if a shared switch basic key is configured for the switch equipment SW1 and the switch equipment SW2, the fifth packet is directly initiated, and the switch key between the switch equipment SW1 and the switch equipment SW2 can be established only by the "third" process in FIG. 3.

The "(first)" process in FIG. 3 is the precondition description in the embodiment of the present invention, in which the unicast key is established between the adjacent switch equipment based on a security mechanism such as pre-distribution and the switch key has been established between the switch equipment in the current network; the "(second)" and "(third)" processes in FIG. 3 are the switch basic key announcement process and the switch key negotiation process described in the embodiment of the present invention respectively.

After the processes shown in FIG. 3, the switch keys (SW-PDK$_{1-2}$, SW-UDK$_{1-2}$) have been established between the switch equipment SW1 and the switch equipment SW2, encryption process and data integrity protection can be performed on the data packet from the switch equipment SW1 to the switch equipment SW2 by using the switch user data key SW-UDK$_{1-2}$ between them. When the switch equipment SW1 needs to send data to the switch equipment SW2, the switch equipment SW1 encrypts the data by using the switch user data key SW-UDK$_{1-2}$ between the switch equipment SW1 and the switch equipment SW2 and sends the encrypted data. The middle switch equipment such as SW-M transmits the data packet directly, rather than perform the processes of decryption and then re-encryption, and the data packet will finally be decrypted by using the switch user data key $SW\text{-}UDK_{1\text{-}2}$ between the switch equipment SW1 and the switch equipment SW2.

The information, such as whether the switch equipment has been configured with the shared switch basic key, can be announced to the switch equipment SW-M during the access identification process of the switch equipment SW1, so that the switch equipment SW-M can judge whether it is necessary to initiate the switch basic key announcement process, and the specific implementation will not be defined and limited in detail in the embodiment of the present invention.

By multiple switch basic key announcement processes and switch key negotiation processes, a switch key can be established between the switch equipment SW1 and all the other switch, equipment in the network. Finally, there exists a switch key between every two switch equipment in the network, i.e., security connection between the switch equipment in the network has been established. Then the data security communication between switch equipment can be protected directly by using the user data key UDK in the switch key between them.

The system for establishing security connection between switch equipment in the embodiment of the present invention includes: a switch equipment SW1 adapted for sending a switch key negotiation activation packet and a switch key negotiation response packet to a switch equipment SW2 and receiving a switch key negotiation request packet sent by the switch equipment SW2; and the switch equipment SW2 adapted for receiving the switch key negotiation activation packet and the switch key negotiation response packet sent by the switch equipment SW1 and sending the switch key negotiation request packet to the switch equipment SW1.

In the system for establishing security connection between switch equipment in the embodiment of the present invention, the switch equipment SW2 can further send a switch key negotiation confirmation packet to the switch equipment SW1; in this case, the switch equipment SW1 receives the switch key negotiation confirmation packet sent by the switch equipment SW2.

The system for establishing security connection between switch equipment in the embodiment of the present invention further includes: a switch equipment SW-M adapted for sending a switch basic key announcement packet to the switch equipment SW2 or the switch equipment SW1 and receiving a switch basic key announcement response packet sent by the switch equipment SW2 or the switch equipment SW1; in this case, the switch equipment SW2 in the above system receives the switch basic key announcement packet sent by the switch equipment SW-M, and sends a switch basic announcement response packet to the switch equipment SW-M; and the switch equipment SW1 in the above system receives the switch basic key announcement packet sent by the switch equipment SW-M, and sends a switch basic announcement response packet to the switch equipment SW-M.

What is claimed is:

1. A method for establishing security connection between switch equipment by calculating and saving a switch key between a first switch equipment and a second switch equipment, comprising:

1) sending, by a first switch equipment, a switch key negotiation activation packet to a second switch equipment, the switch key negotiation activation packet comprising an $N_{SW1}$ field; wherein
the $N_{SW1}$ field indicates a switch key negotiation identifier, a value of which is a random number generated by the first switch equipment during a first-time switch key negotiation process between the first switch equipment and the second switch equipment, and is equal to the value of a switch key negotiation identifier calculated during a last-time switch key negotiation process during a switch key negotiation updating process;

2) constructing, by the second switch equipment, a switch key negotiation request packet and sending the switch key negotiation request packet to the first switch equipment, after receiving the switch key negotiation activation packet sent by the first switch equipment, the switch key negotiation request packet comprising an $N_{SW2}$ field, an $N_{SW1}$ field and a MIC5 field,
wherein
the $N_{SW2}$ field indicates an inquiry of the second switch equipment, and is a random number generated by the second switch equipment;
the $N_{SW1}$ field in the switch key negotiation request packet indicates the switch key negotiation identifier, the value of which directly depends on the value of the $N_{SW1}$ field in the switch key negotiation activation packet in the case of the first-time switch key negotiation process between the first switch equipment and the second switch equipment, and is the value of the switch key negotiation identifier that is calculated during the last-time switch key negotiation process in the case of the switch key negotiation updating process; and
the MIC5 field indicates a message identification code, and is a hash value obtained by the second switch equipment performing hash function calculation on the fields in the switch key negotiation request packet other than the MIC5 field by using a switch protocol data key $SW\text{-}PDK_{1\text{-}2}$ in the calculated switch key;

3) constructing, by the first switch equipment, a switch key negotiation response packet and sending the switch key negotiation response packet to the second switch equipment, after receiving the switch key negotiation request packet sent by the second switch equipment; and 4) confirming, by the second switch equipment, that the switch key obtained by the first switch equipment is consistent with that of the second switch equipment, after receiving the switch key negotiation response packet sent by the first switch equipment.

2. The method for establishing security connection between switch equipment according to claim 1, wherein the constructing, by the second switch equipment, a switch key negotiation request packet and sending the switch key negotiation request packet to the first switch equipment, comprises:

checking, by the second switch equipment, whether the value of the switch key negotiation identifier $N_{SW1}$ in the switch key negotiation activation packet is consistent with the value of the switch key negotiation identifier calculated during the last-time switch key negotiation process, if the switch key negotiation process is the switch key negotiation updating process;

generating an inquiry $N_{SW2}$, calculating and saving the switch key between the first switch equipment and the second switch equipment and the switch key negotiation identifier $N_{SW1}$ for the next switch key negotiation process by using a switch basic key $SW\text{-}BK_{1\text{-}2}$ between the first switch equipment and the second switch equipment, the switch key negotiation identifier $N_{SW1}$ and the inquiry $N_{SW2}$ of the second switch equipment, if the value of the switch key negotiation identifier $N_{SW1}$ in the switch key negotiation activation packet is consistent with the value of the switch key negotiation identifier calculated during the last-time switch key negotiation process or if this switch key negotiation process is the first-time switch key negotiation process; wherein the switch key between the first switch equipment and the second switch equipment is the switch protocol data key SW-PDK$_{1-2}$ and a switch user data key SW-UDK$_{1-2}$; and calculating the message identification code MIC5 locally by using the switch protocol data key SW-PDK$_{1-2}$ in the calculated switch key, constructing a switch key negotiation request packet and sending the switch key negotiation request packet to the first switch equipment.

3. The method for establishing security connection between switch equipment according to claim 2, wherein the constructing a switch key negotiation response packet and sending the switch key negotiation response packet to the second switch equipment, comprises:

checking whether the value of the switch key negotiation identifier N$_{SW1}$ field in the switch key negotiation request packet is consistent with the value of the switch key negotiation identifier calculated during the last-time switch key negotiation process, if this switch key negotiation process is the switch key negotiation updating process; and checking whether the value of the switch key negotiation identifier N$_{SW1}$ field in the switch key negotiation request packet is consistent with the value of the switch key negotiation identifier N$_{SW1}$ field in the switch key negotiation activation packet, if this switch key negotiation process is the first-time switch key negotiation process;

calculating and saving the switch key between the second switch equipment and the first switch equipment and the switch key negotiation identifier N$_{SW1}$ for the next switch key negotiation process by using the switch basic key SW-BK$_{1-2}$ between the second switch equipment and the first switch equipment, the switch key negotiation identifier N$_{SW1}$ and the inquiry N$_{SW2}$ of the second switch equipment, if the value of the switch key negotiation identifier N$_{SW1}$ in the switch key negotiation request packet is consistent with the value of the switch key negotiation identifier calculated during the last-time switch key negotiation process, or if the value of the switch key negotiation identifier N$_{SW1}$ field in the switch key negotiation request packet is consistent with the value of the switch key negotiation identifier N$_{SW1}$ field in the switch key negotiation activation packet; wherein the switch key between the second switch equipment and the first switch equipment comprises the switch protocol data key SW-PDK$_{1-2}$ and the switch user data key SW-UDK$_{1-2}$;

verifying whether the MIC5 field in the switch key negotiation request packet is correct by using the switch protocol data key SW-PDK$_{1-2}$ in the calculated switch key;

calculating a message identification code MIC6 locally by using the switch protocol data key SW-PDK$_{1-2}$ in the calculated switch key, constructing the switch key negotiation response packet and sending the switch key negotiation response packet to the second switch equipment, if the MIC5 field in the switch key negotiation request packet is correct; wherein the switch key negotiation response packet comprises: an N$_{SW2}$ field and a MIC6 field;

wherein the N$_{SW2}$ field indicates the inquiry of the second switch equipment, and is a random number generated by the second switch equipment, the value of which is equal to the value of the N$_{SW2}$ field in the switch key negotiation request packet; and the MIC6 field indicates the message identification code, and is a hash value obtained by the first switch equipment performing hash function calculation on the fields in the switch key negotiation response packet other than the MIC6 field, or on the fields in the switch key negotiation response packet other than the MIC6 field and the calculated switch key negotiation identifier N$_{SW1}$ for the next switch key negotiation process, by using the switch protocol data key SW-PDK$_{1-2}$ in the calculated switch key.

4. The method for establishing security connection between switch equipment according to claim 3, wherein the confirming, by the second switch equipment, whether the switch key obtained by the first switch equipment is consistent with that of the second switch equipment, comprises:

checking, by the second switch equipment, whether the inquiry N$_{SW2}$ field of the second switch equipment in the switch key negotiation response packet is consistent with the inquiry N$_{SW2}$ field of the second switch equipment in the switch key negotiation request packet that is sent previously;

verifying whether the message identification code MIC6 field of the second switch equipment in the switch key negotiation response packet is correct by using the switch protocol data key SW-PDK$_{1-2}$ in the calculated switch key, if consistent; and the second switch equipment confirming that the switch key obtained by the first switch equipment is consistent with that of the second switch equipment if the message identification code MIC6 field of the second switch equipment in the switch key negotiation response packet is correct.

5. The method for establishing security connection between switch equipment according to claim 4, further comprising:

calculating, by the second switch equipment, a message identification code MIC7 locally by using the switch protocol data key SW-PDK$_{1-2}$ in the calculated switch key, constructing a switch key negotiation confirmation packet and sending the switch key negotiation confirmation packet to the first switch equipment, if the second switch equipment needs to construct the switch key negotiation confirmation packet; wherein the switch key negotiation confirmation packet comprises an N$_{SW1}$ field and a MIC7 field, wherein the N$_{SW1}$ field indicates the switch key negotiation identifier, the value of which is equal to the value of the N$_{SW1}$ field in the switch key negotiation request packet; and the MIC7 field indicates the message identification code, and is a hash value obtained by the second switch equipment performing hash function calculation on the fields in the switch key negotiation confirmation packet other than the MIC7 field, or on the fields in the switch key negotiation confirmation packet other than the MIC7 field and the calculated switch key negotiation identifier N$_{SW1}$ for the next switch key negotiation process, by using the switch protocol data key SW-PDK$_{1-2}$ in the calculated switch key, confirming, by the first switch equipment, whether the switch key obtained by the second switch equipment is consistent with that of the first switch equipment, after receiving the switch key negotiation confirmation packet sent by the second switch equipment.

6. The method for establishing security connection between switch equipment according to claim 5, wherein the confirming, by the first switch equipment, whether the switch key obtained by the second switch equipment is consistent with that of the first switch equipment, comprises:
  checking, by the first switch equipment, whether the value of the switch key negotiation identifier $N_{SW1}$ field in the switch key negotiation confirmation packet is consistent with the value of the switch key negotiation identifier $N_{SW1}$ field in the received switch key negotiation request packet;
  verifying whether the message identification code MIC7 field in the switch key negotiation confirmation packet is correct by using the switch protocol data key $SW\text{-}PDK_{1-2}$ in the calculated switch key, if consistent; and confirming, by the first switch equipment, that the switch key obtained by the second switch equipment is consistent with that of the first switch equipment if the message identification code MIC7 field in the switch key negotiation confirmation packet is correct.

7. The method for establishing security connection between switch equipment according to claim 6, further comprising:
  constructing, by the first switch equipment, a switch key negotiation activation packet and sending the switch key negotiation activation packet to the second switch equipment, so as to request the second switch equipment to update or delete the switch key between the second switch equipment and the first switch equipment, in the case that the first switch equipment needs to update or withdraw the switch key between the second switch equipment and the first switch equipment; or
  constructing, by the second switch equipment, a switch key negotiation activation packet and sending the switch key negotiation activation packet to the first switch equipment, so as to request the first switch equipment to update or delete the switch key between the first switch equipment and the second switch equipment, in the case that the second switch equipment needs to update or withdraw the switch key between the first switch equipment and the second switch equipment.

8. The method for establishing security connection between switch equipment according to claim 1, wherein when the first switch equipment accesses the network through a third switch equipment, a shared unicast key has been established between the first switch equipment and the third switch equipment, which directly serves as the switch key between the first switch equipment and the third switch equipment, and after the switch key is established between the third switch equipment and the second switch equipment, the method further comprises:
  constructing, by the third switch equipment, a switch basic key announcement packet and sending the switch basic key announcement packet to the second switch equipment, before the first switch equipment sends the switch key negotiation activation packet to the second switch equipment; wherein this switch basic key announcement packet comprises: a KN2 field, an $E_2$ field and a MIC1 field,
  wherein
  the KN2 field indicates a key announcement identifier of the second switch equipment, the value of which is an integral number and an initial value of which is a fixed value, and the value of the KN2 field is increased by 1 or a fixed value every time the switch basic key announcement is performed on the second switch equipment;
  the $E_2$ field indicates a key-encrypted data, and is the data obtained by the third switch equipment encrypting the switch basic key $SW\text{-}BK_{1-2}$ with the switch protocol data key $SW\text{-}PDK_{2-M}$ between the second switch equipment and the third switch equipment; and
  the MIC1 field indicates the message identification code, and is a hash value obtained by the third switch equipment performing hash function calculation on the fields in the switch basic key announcement packet other than the MIC1 field by using the switch protocol data key $SW\text{-}PDK_{2-M}$ between the second switch equipment and the third switch equipment,
  constructing, by the second switch equipment, a switch basic key announcement response packet and sending the switch basic key announcement response packet to the third switch equipment after receiving the switch basic key announcement packet sent by the third switch equipment;
  constructing, by the third switch equipment, a switch basic key announcement packet and sending the switch basic key announcement packet to the first switch equipment after receiving the switch basic key announcement response packet sent by the second switch equipment;
  constructing, by the first switch equipment, a switch basic key announcement response packet and sending the switch basic key announcement response packet to the third switch equipment after receiving the switch basic key announcement packet sent by the third switch equipment; and
  receiving the switch basic key announcement response packet sent by the first switch equipment, by the third switch equipment.

9. The method for establishing security connection between switch equipment according to claim 8, wherein the constructing, by the second switch equipment, a switch basic key announcement response packet and sending the switch basic key announcement response packet to the third switch equipment, comprises:
  checking, by the second switch equipment, whether the key announcement identifier KN2 field in the switch basic key announcement packet increases monotonically;
  verifying whether the message identification code MIC1 field is correct by using the switch protocol data key $SW\text{-}PDK_{2-M}$ between the third switch equipment and the second switch equipment, if the key announcement identifier KN2 field in the switch basic key announcement packet increases monotonically;
  decrypting the key-encrypted data $E_2$ field by using the switch protocol data key $SW\text{-}PDK_{2-M}$ between the third switch equipment and the second switch equipment, so as to obtain the switch basic key $SW\text{-}BK_{1-2}$ between the first switch equipment and the second switch equipment, if the message identification code MIC1 field is correct;
  saving the value of this key announcement identifier KN2 field, constructing a switch basic key announcement response packet and sending the switch basic key announcement response packet to the third switch equipment, wherein this switch basic key announcement response packet comprises: a KN2 field and a MIC2 field;
  wherein
  the KN2 field indicates the key announcement identifier of the second switch equipment, the value of which is the same as the value of the key announcement identifier KN2 field in the received switch basic key announcement packet; and the MIC2 field indicates the message identification code, and is a hash value obtained by the second switch equipment performing hash function calculation on the fields in the switch basic key announcement response packet other than the MIC2 field by using the switch protocol data key SW-PDK$_{2-M}$ between the third switch equipment and the second switch equipment.

10. The method for establishing security connection between switch equipment according to claim 9, wherein the constructing, by the third switch equipment, a switch basic key announcement packet and sending the switch basic key announcement packet to the first switch equipment, comprises:

comparing, by the third switch equipment, to determine whether the value of the key announcement identifier KN2 field in the switch basic key announcement response packet is consistent with the value of the key announcement identifier KN2 field in the switch basic key announcement packet sent to the second switch equipment sent previously;

verifying whether the message identification code MIC2 field is correct by using the switch protocol data key SW-PDK$_{2-M}$ between the second switch equipment and the third switch equipment, if the value of the key announcement identifier KN2 field in the switch basic key announcement response packet is consistent with the value of the key announcement identifier KN2 field in the switch basic key announcement packet sent to the second switch equipment; saving the value of this key announcement identifier KN2 field, if the message identification code MIC2 field is correct, so as to finish the announcement of the switch basic key SW-BK$_{1-2}$ between the first switch equipment and the second switch equipment to the second switch equipment;

constructing, by the third switch equipment, a switch basic key announcement packet according to the switch basic key SW-BK$_{1-2}$ that is previously announced to the second switch equipment, and sending the switch basic key announcement packet to the first switch equipment; wherein the switch basic key announcement packet comprises: a KN1 field, an E$_1$ field and a MIC3 field;

wherein the KN1 field indicates the key announcement identifier of the first switch equipment, the value of which is an integral number and the initial value of which is a fixed value, and the value of the KN1 field is increased by 1 or a fixed value every time the switch basic key announcement is performed on the first switch equipment;

the E$_1$ field indicates the key-encrypted data, and is the data obtained by the third switch equipment encrypting the switch basic key SW-BK$_{1-2}$ with the switch protocol data key SW-PDK$_{1-M}$ between the first switch equipment and the third switch equipment, wherein the switch basic key SW-BK$_{1-2}$ is the same as the switch basic key SW-BK$_{1-2}$ that is announced to the second switch equipment; and the MIC3 field indicates the message identification code, and is a hash value obtained by the third switch equipment performing hash function calculation on the fields in the switch basic key announcement packet other than the MIC3 field by using the switch protocol data key SW-PDK$_{1-M}$ between the first switch equipment and the third switch equipment.

11. The method for establishing security connection between switch equipment according to claim 10, wherein the constructing, by the first switch equipment, a switch basic key announcement response packet and sending the switch basic key announcement response packet to the third switch equipment, comprises:

checking, by the first switch equipment, whether the key announcement identifier KN1 field in the switch basic key announcement packet increases monotonically;

verifying whether the message identification code MIC3 field is correct by using the switch protocol data key SW-PDK$_{1-M}$ between the third switch equipment and the first switch equipment, if the key announcement identifier KN1 field in the switch basic key announcement packet increases monotonically;

decrypting the key-encrypted data E$_1$ field by using the switch protocol data key SW-PDK$_{1-M}$ between the third switch equipment and the first switch equipment to obtain the switch basic key SW-BK$_{1-2}$ between the second switch equipment and the first switch equipment, if the message identification code MIC3 field is correct;

saving the value of the key announcement identifier KN1 field, constructing a switch basic key announcement response packet and sending the switch basic key announcement response packet to the third switch equipment, wherein the switch basic key announcement response packet comprises: a KN1 field and a MIC4 field, wherein the KN1 field indicates the key announcement identifier of the first switch equipment, the value of which is the same as the value of the key announcement identifier KN1 field in the received switch basic key announcement packet; and the MIC4 field indicates the message identification code, and is a hash value obtained by the first switch equipment performing hash function calculation on the fields in the switch basic key announcement response packet other than the MIC4 field by using the switch protocol data key SW-PDK$_{1-M}$ between the first switch equipment and the third switch equipment.

12. The method for establishing security connection between switch equipment according to claim 11, further comprising:

comparing, by the third switch equipment, to determine whether the value of the key announcement identifier KN1 field in the switch basic key announcement response packet is consistent with the value of the key announcement identifier KN1 field in the switch basic key announcement packet sent to the first switch equipment previously, after receiving the switch basic key announcement response packet sent by the first switch equipment; and verifying whether the message identification code MIC4 field is correct by using the switch protocol data key SW-PDK$_{1-M}$ between the first switch equipment and the third switch equipment, by the third switch equipment, if consistent; saving the value of the key announcement identifier KN1 field if the message identification code MIC4 field is correct, so as to finish the announcement of the switch basic key SW-BK$_{1-2}$ between the first switch equipment and the second switch equipment to the first switch equipment.

13. The method for establishing security connection between switch equipment according to claim 12, further comprising:

constructing, by the third switch equipment, a switch basic key announcement packet, sending the switch basic key announcement packet to the first switch equipment or the second switch equipment to request the first switch equipment or the second switch equipment to update or delete the switch basic key between the first switch equipment and the second switch equipment, if the third switch equipment needs to update or withdraw the switch basic key between the first switch equipment and the second switch equipment.

14. A system for establishing security connection between switch equipment by calculating and saving a switch key between a first switch equipment and a second switch equipment, comprising:

a first switch equipment adapted for sending a switch key negotiation activation packet and a switch key negotiation response packet to a second switch equipment, the switch key negotiation activation packet comprising an $N_{SW1}$ field; wherein the $N_{SW1}$ field indicates a switch key negotiation identifier, a value of which is a random number generated by the first switch equipment during a first-time switch key negotiation process between the first switch equipment and the second switch equipment, and is equal to the value of a switch key negotiation identifier calculated during a last-time switch key negotiation process during a switch key negotiation updating process; and receiving a switch key negotiation request packet sent by the second switch equipment, the switch key negotiation request packet comprising an $N_{SW2}$ field, an $N_{SW1}$ field and a MIC5 field, wherein the $N_{SW2}$ field indicates an inquiry of the second switch equipment, and is a random number generated by the second switch equipment; the $N_{SW1}$ field in the switch key negotiation request packet indicates the switch key negotiation identifier, the value of which directly depends on the value of the $N_{SW1}$ field in the switch key negotiation activation packet in the case of the first-time switch key negotiation process between the first switch equipment and the second switch equipment, and is the value of the switch key negotiation identifier that is calculated during the last-time switch key negotiation process in the case of the switch key negotiation updating process; and the MIC5 field indicates a message identification code, and is a hash value obtained by the second switch equipment performing hash function calculation on the fields in the switch key negotiation request packet other than the MIC5 field by using a switch protocol data key $SW\text{-}PDK_{1-2}$ in the calculated switch key; constructing the switch key negotiation response packet and sending the switch key negotiation response packet to the second switch equipment; and the second switch equipment adapted for receiving the switch key negotiation activation packet and the switch key negotiation response packet sent by the first switch equipment; sending the switch key negotiation request packet to the first switch equipment; and confirming that the switch key obtained by the first switch equipment is consistent with that of the second switch equipment.

15. The system for establishing security connection between switch equipment according to claim 14, wherein:

the second switch equipment is further adapted for sending a switch key negotiation confirmation packet to the first switch equipment; and the first switch equipment is further adapted for receiving the switch key negotiation confirmation packet sent by the second switch equipment.

16. The system for establishing security connection between switch equipment according to claim 15, further comprising:

a third switch equipment adapted for sending a switch basic key announcement packet to the second switch equipment or the first switch equipment and receiving a switch basic key announcement response packet sent by the second switch equipment or the first switch equipment, wherein the second switch equipment is further adapted for receiving the switch basic key announcement packet sent by the third switch equipment, and sending a switch basic announcement response packet to the third switch equipment; and the first switch equipment is further adapted for receiving the switch basic key announcement packet sent by the third switch equipment, and sending a switch basic announcement response packet to the third switch equipment.

17. The system for establishing security connection between switch equipment according to claim 14, further comprising:

a third switch equipment adapted for sending a switch basic key announcement packet to the second switch equipment or the first switch equipment and receiving a switch basic key announcement response packet sent by the second switch equipment or the first switch equipment, wherein the second switch equipment is further adapted for receiving the switch basic key announcement packet sent by the third switch equipment, and sending a switch basic announcement response packet to the third switch equipment; and the first switch equipment is further adapted for receiving the switch basic key announcement packet sent by the third switch equipment, and sending a switch basic announcement response packet to the third switch equipment.

* * * * *